United States Patent
Younkins et al.

(10) Patent No.: US 11,624,331 B2
(45) Date of Patent: *Apr. 11, 2023

(54) USE OF DIFFERENT PNEUMATIC CYLINDER SPRING TYPES IN A VARIABLE DISPLACEMENT ENGINE FOR ENGINE AND AFTERTREATMENT SYSTEM TEMPERATURE CONTROL

(71) Applicant: Tula Technology, Inc., San Jose, CA (US)

(72) Inventors: Matthew A. Younkins, Campbell, CA (US); Xi Luo, San Jose, CA (US)

(73) Assignee: Tula Technology, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/693,016

(22) Filed: Mar. 11, 2022

(65) Prior Publication Data

US 2022/0195954 A1 Jun. 23, 2022

Related U.S. Application Data

(63) Continuation of application No. 17/224,648, filed on Apr. 7, 2021, now Pat. No. 11,306,672.
(Continued)

(51) Int. Cl.
*F02D 41/06* (2006.01)
*F02D 17/02* (2006.01)
(Continued)

(52) U.S. Cl.
CPC ............. *F02D 41/064* (2013.01); *F01L 1/34* (2013.01); *F01L 9/16* (2021.01); *F01M 1/02* (2013.01);
(Continued)

(58) Field of Classification Search
CPC ..... F01L 1/34; F01L 9/16; F01M 1/02; F01M 1/16; F01M 5/001; F01N 3/035;
(Continued)

(56) References Cited

U.S. PATENT DOCUMENTS

| 4,434,767 A | 3/1984 | Kohama et al. |
| 4,489,695 A | 12/1984 | Kohama et al. |

(Continued)

FOREIGN PATENT DOCUMENTS

| EP | 0026249 | 4/1981 |
| JP | 2000179366 | 6/2000 |

(Continued)

OTHER PUBLICATIONS

International Search Report and Written Opinion dated Jul. 20, 2021, from International Application No. PCT/US2021/026331.

*Primary Examiner* — Audrey B. Walter
*Assistant Examiner* — Dapinder Singh
(74) *Attorney, Agent, or Firm* — Beyer Law Group LLP (57) ABSTRACT

A system and method for a variable displacement internal combustion engine using different types of pneumatic cylinder springs on skipped working cycles to control engine and aftertreatment system temperatures are described. The system and method may be used to rapidly heat up the aftertreatment system(s) and/or an engine block of the engine following a cold start by using one or more different types of pneumatic cylinder springs during skipped firing opportunities. By rapidly heating the aftertreatment system (s) and/or engine block, noxious emissions such as hydrocarbons, carbon monoxide, $NO_x$ and/or particulates, following cold starts are significantly reduced.

20 Claims, 5 Drawing Sheets

Related U.S. Application Data (60) Provisional application No. 63/029,042, filed on May 22, 2020.

(51) Int. Cl.

| | | |
|---|---|---|
| *F02P 5/14* | (2006.01) | |
| *F02D 41/00* | (2006.01) | |
| *F02D 41/40* | (2006.01) | |
| *F01N 3/10* | (2006.01) | |
| *F01L 1/34* | (2006.01) | |
| *F02D 41/30* | (2006.01) | |
| *F01N 3/035* | (2006.01) | |
| *F01N 3/20* | (2006.01) | |
| *F01M 1/16* | (2006.01) | |
| *F01L 9/16* | (2021.01) | |
| *F01M 1/02* | (2006.01) | |
| *F01M 5/00* | (2006.01) | |

(52) U.S. Cl.
CPC .............. *F01M 1/16* (2013.01); *F01M 5/001* (2013.01); *F01N 3/035* (2013.01); *F01N 3/101* (2013.01); *F01N 3/2066* (2013.01); *F02D 17/02* (2013.01); *F02D 41/0002* (2013.01); *F02D 41/0047* (2013.01); *F02D 41/068* (2013.01); *F02D 41/3017* (2013.01); *F02P 5/14* (2013.01)

(58) Field of Classification Search
CPC ........ F01N 3/101; F01N 3/103; F01N 3/2006; F01N 3/2066; F01N 9/00; F01N 2430/02; F01N 2900/08; F01N 2900/1626; F02D 17/02; F02D 41/0002; F02D 41/0047; F02D 41/0087; F02D 41/0255; F02D 41/062; F02D 41/064; F02D 41/068; F02D 41/3017; F02P 5/14

See application file for complete search history.

(56) References Cited

U.S. PATENT DOCUMENTS

| | | | |
|---|---|---|---|
| 4,509,488 A | 4/1985 | Forster et al. | |
| 5,377,631 A | 1/1995 | Schechter | |
| 5,467,748 A | 11/1995 | Stockhausen | |
| 5,934,263 A | 8/1999 | Russ et al. | |
| 6,158,411 A | 12/2000 | Morikawa | |
| 6,619,258 B2 | 9/2003 | McKay et al. | |
| 7,063,062 B2 | 6/2006 | Lewis et al. | |
| 7,066,136 B2 | 6/2006 | Ogiso | |
| 7,086,386 B2 | 8/2006 | Doering | |
| 7,255,081 B2 * | 8/2007 | Sieber | F02N 99/006 123/179.17 |
| 7,503,312 B2 | 3/2009 | Sumilla et al. | |
| 7,577,511 B1 | 8/2009 | Tripathi et al. | |
| 7,849,835 B2 | 12/2010 | Tripathi et al. | |
| 7,886,715 B2 | 2/2011 | Tripathi et al. | |
| 7,930,087 B2 | 4/2011 | Gibson et al. | |
| 7,954,474 B2 | 6/2011 | Tripathi et al. | |
| 8,099,224 B2 | 1/2012 | Tripathi et al. | |
| 8,131,445 B2 | 3/2012 | Tripathi et al. | |
| 8,131,447 B2 | 3/2012 | Tripathi et al. | |
| 8,464,690 B2 | 6/2013 | Yuille et al. | |
| 8,616,181 B2 | 12/2013 | Sahandiefanjani et al. | |
| 8,651,091 B2 | 2/2014 | Tripathi et al. | |
| 8,839,766 B2 | 9/2014 | Serrano | |
| 8,869,773 B2 | 10/2014 | Tripathi et al. | |
| 9,020,735 B2 | 4/2015 | Tripathi et al. | |
| 9,086,020 B2 | 7/2015 | Tripathi et al. | |
| 9,120,478 B2 | 9/2015 | Carlson et al. | |
| 9,175,613 B2 | 11/2015 | Parsels et al. | |
| 9,200,575 B2 | 12/2015 | Shost | |
| 9,200,587 B2 | 12/2015 | Serrano | |
| 9,212,610 B2 | 12/2015 | Chen et al. | |
| 9,267,454 B2 | 2/2016 | Wilcutts et al. | |
| 9,273,643 B2 | 3/2016 | Carlson et al. | |
| 9,291,106 B2 | 3/2016 | Switkes et al. | |
| 9,328,672 B2 | 5/2016 | Serrano et al. | |
| 9,387,849 B2 | 7/2016 | Soliman et al. | |
| 9,399,964 B2 | 7/2016 | Younkins et al. | |
| 9,512,794 B2 | 12/2016 | Serrano et al. | |
| 9,562,470 B2 | 2/2017 | Younkins et al. | |
| 9,581,097 B2 | 2/2017 | Younkins et al. | |
| 9,689,327 B2 | 6/2017 | Younkins et al. | |
| 9,726,094 B2 | 8/2017 | Younkins et al. | |
| 9,784,644 B2 | 10/2017 | Chen et al. | |
| 9,790,867 B2 | 10/2017 | Carlson et al. | |
| 9,835,522 B2 | 12/2017 | Chen et al. | |
| 9,890,732 B2 | 2/2018 | Younkins et al. | |
| 10,012,161 B2 | 7/2018 | Shost et al. | |
| 10,018,097 B2 * | 7/2018 | Styles | F02M 26/30 |
| 10,121,161 B2 | 7/2018 | Shost et al. | |
| 10,060,368 B2 | 8/2018 | Pirjaberi et al. | |
| 10,167,799 B2 | 1/2019 | Serrano et al. | |
| 10,247,072 B2 | 4/2019 | Younkins et al. | |
| 10,408,140 B2 | 9/2019 | Yuan et al. | |
| 10,493,836 B2 | 12/2019 | Serrano et al. | |
| 10,619,584 B2 | 4/2020 | Fuschetto et al. | |
| 10,808,672 B2 * | 10/2020 | Ortiz-Soto | F02P 5/045 |
| 10,830,169 B1 | 11/2020 | Banker et al. | |
| 10,900,425 B2 | 1/2021 | Yuan et al. | |
| 11,261,807 B2 | 3/2022 | Fuschetto et al. | |
| 11,306,672 B2 * | 4/2022 | Younkins | F02D 41/064 |
| 2003/0121249 A1 | 7/2003 | Foster et al. | |
| 2009/0066337 A1 | 3/2009 | Gibson et al. | |
| 2010/0050993 A1 | 3/2010 | Zhao et al. | |
| 2010/0100299 A1 | 4/2010 | Tripathi et al. | |
| 2012/0102920 A1 | 5/2012 | Pipis, Jr. | |
| 2014/0034010 A1 | 2/2014 | Serrano et al. | |
| 2014/0090623 A1 | 4/2014 | Beikmann | |
| 2015/0136082 A1 | 5/2015 | Younkins et al. | |
| 2016/0024981 A1 | 1/2016 | Parsels et al. | |
| 2016/0116371 A1 | 4/2016 | Chen et al. | |
| 2016/0222899 A1 | 8/2016 | Glugia | |
| 2017/0356381 A1 | 12/2017 | Richards et al. | |
| 2017/0370308 A1 * | 12/2017 | Hashemi | F02D 13/06 |
| 2018/0230919 A1 | 8/2018 | Nagashima et al. | |
| 2018/0266347 A1 | 9/2018 | Fuschetto et al. | |
| 2019/0003442 A1 | 1/2019 | Ortiz-Soto et al. | |
| 2019/0003443 A1 | 1/2019 | Ortiz-Soto et al. | |
| 2019/0390611 A1 | 12/2019 | McCarthy, Jr. et al. | |
| 2021/0040904 A1 | 2/2021 | Carlson et al. | |
| 2021/0363931 A1 | 11/2021 | Younkins et al. | |

FOREIGN PATENT DOCUMENTS

| | | |
|---|---|---|
| WO | WO 2010/006311 | 1/2010 |
| WO | WO 2011/085383 | 7/2011 |

* cited by examiner

USE OF DIFFERENT PNEUMATIC CYLINDER SPRING TYPES IN A VARIABLE DISPLACEMENT ENGINE FOR ENGINE AND AFTERTREATMENT SYSTEM TEMPERATURE CONTROL

CROSS-REFERENCE TO RELATED APPLICATIONS

This application is a Continuation of U.S. application Ser. No. 17/224,648 filed Apr. 7, 2021, which claims priority to U.S. Provisional Application No. 63/029,042, filed May 22, 2020, both of which are incorporated by reference herein for all purposes.

FIELD OF THE INVENTION

The present invention relates to a variable displacement internal combustion engine using different types of pneumatic cylinder springs on skipped working cycles to control engine and aftertreatment system temperatures.

BACKGROUND

Most vehicles in operation today are powered by internal combustion (IC) engines. Internal combustion engines typically have multiple cylinders or other working chambers where combustion occurs. The power generated by the engine depends on the amount of fuel and air that is delivered to each working chamber.

Current aftertreatment systems typically require a period of time (e.g., 20 to 30 seconds) to reach "light off temperature" following a cold start. For modern aftertreatment systems, such as a three-way catalytic converter, the light off temperature is usually around 200° C.-300° C. During this period, while the aftertreatment system is still cold, the vehicle emits significantly higher pollution levels compared to vehicle emissions after the catalyst reaches warm operating temperatures equal to or above that of the light off temperature.

Vehicles generate significant amounts of pollution emissions upon cold starts for several reasons. First, with a cold engine, fuel vaporization is relatively poor. As a result, a significant portion of the fuel injected during the firing of working cycles is not combusted. The non-combusted fuel is instead exhausted into the aftertreatment system(s), resulting in increased hydrocarbon emissions. Second, the aftertreatment system(s) of the vehicle are also typically cold, meaning they are operating well below their peak efficiency operating temperature(s) (e.g., "light-off" temperature). Since the aftertreatment system is not operating efficiently, significant amounts of pollutants, including carbon monoxide, $NO_x$ and/or particulates are emitted from the tailpipe of the vehicle.

With skip fire controlled engines, using a lower firing fraction after a cold start is a known approach to help speed up the warming process of aftertreatment system(s), such as catalytic converters. For example, with a four cylinder engine, it is typically advantageous to fire just two cylinders at a higher load per cylinder during a cold start as opposed to firing all four cylinders, each at a lower load. The exhaust gases of firing just two cylinders will be hotter than firing all four cylinders due to various effects such as different heat transfer rates or burn rates. As a result, exhaust temperatures for a given engine tend to increase as the load output per cylinder increases. With a hotter exhaust, the aftertreatment systems warm up faster.

While firing fewer cylinders during a cold start of a skip fire controlled engine has its advantages, further improvements are always beneficial. A system and method to rapidly heat up the aftertreatment system(s) and/or engine of a vehicle to reduce pollutants following a cold start is therefore needed.

SUMMARY OF THE INVENTION

The present invention is directed to use of different pneumatic cylinder spring types in a skip fire controlled engine to control engine and aftertreatment system temperatures. Particularly after a cold engine start, more rapid warm up of aftertreatment systems(s) and/or an engine block is realized by using one or more different types of pneumatic cylinder springs during skipped firing opportunities.

In various non-exclusive embodiments, the present invention is directed to a system and method of operating an internal combustion engine of a vehicle. The invention involves ascertaining a cold start of the internal combustion engine, operating one or more cylinders of the internal combustion engine as a Low Pressure Exhaust Spring (LPES) until an aftertreatment system fluidly coupled to the internal combustion engine has reached a "light-off" temperature, operating the one or more cylinders of the internal combustion engine as a High Pressure Exhaust Spring (HPES) after the aftertreatment system has reached the "light-off" temperature and then operating the internal combustion engine in a skip fire manner after the temperature of the internal combustion engine has reached a predetermined threshold. When operating in the skip fire manner after the he temperature of the internal combustion engine has reached the predetermined threshold, skipped cylinders can be selectively operated as LPES, HPES or Air Spring (AS) type pneumatic springs.

BRIEF DESCRIPTION OF THE DRAWINGS

The invention and the advantages thereof, may best be understood by reference to the following description taken in conjunction with the accompanying drawings in which.

In the drawings, like reference numerals are sometimes used to designate like structural elements. It should also be appreciated that the depictions in the figures are diagrammatic and not to scale.

DETAILED DESCRIPTION

The vast majority of internal combustion engines are either spark ignition or compression ignition.

Spark Ignition and Compression Engines

Spark ignition engines rely on spark to initiate combustion. Spark ignition engines are generally operated with a stoichiometric fuel/air ratio and the mass air charge (MAC) provided to a cylinder controls its torque output. The mass air charge is generally controlled using a throttle to adjust the intake manifold absolute pressure (MAP).

With compression ignition engines, combustion is initiated by a temperature increase associated with compressing a cylinder chamber charge. Compression ignition engines typically control the engine output by controlling the amount of fuel injected (hence changing the air/fuel stoichiometry), not air flow through the engine. Engine output torque is reduced by adding less fuel to the air entering the working chamber, i.e. running the engine leaner. For example, a Diesel engine may typically operate with air/fuel ratios of 20 to 160 compared to a stoichiometric air/fuel ratio of approximately 14.5. Compression ignition engines may be further classified as stratified charge compression ignition engines (e.g., most conventional Diesel engines, and abbreviated as SCCI), premixed charge compression ignition (PCCI), reactivity controlled compression ignition (RCCI), gasoline compression ignition engines (GCI or GCIE), and homogeneous charge compression ignition (HCCI).

Aftertreatment Systems

Both spark ignition and compression ignition engines generally require one or more aftertreatment elements to limit emission of undesirable pollutants that are combustion byproducts. Catalytic converters and particulate filters are two common aftertreatment elements. Spark ignition engines generally use a three-way catalyst that both oxidizes unburned hydrocarbons and carbon monoxide and reduces nitrous oxides ($NO_x$). Three-way catalysts require that on average the engine combustions be at or near a stoichiometric air/fuel ratio, so that both oxidation and reduction reactions can occur in the catalytic converter. Since compression ignition engines generally run lean, they cannot rely solely on a conventional 3-way catalyst to meet emissions regulations. Instead they use other types of aftertreatment devices to reduce noxious emissions. These aftertreatment devices may use a catalyst such as a Diesel Oxidizing Catalyst (DOC), selective catalyst reduction (SCR), $NO_x$ traps and/or particulate filters to reduce nitrous oxides to molecular nitrogen and capture particulate emissions.

Variable Displacement Engines

The engine must be operated over a wide range of operating speeds and torque output loads to accommodate the needs of everyday driving. Under normal driving conditions, the torque generated by an engine needs to vary over a wide range in order to meet the operational demands of the driver. In situations when full torque is not needed, the fuel efficiency of many types of internal combustion engines can be substantially improved by dynamically varying the displacement of the engine. With dynamic displacement, the engine can operate with full displacement when required, but otherwise operates at a smaller displacement when full torque is not required, resulting in improved fuel efficiency and/or reduced noxious emissions.

The most common method of varying engine displacement is deactivating a group of one or more cylinders. For example, with a six cylinder engine, a group of two, three, or four cylinders may be deactivated. When a cylinder is deactivated, no fuel is delivered to the deactivated cylinders and their associated intake and/or exhaust valves are typically kept closed.

Another engine control approach that varies the effective displacement of an engine is referred to as skip fire engine control. Skip fire engine control contemplates selectively firing cylinders during some firing opportunities, while selectively skipping the firing of cylinders during other firing opportunities. This is equivalent to selectively firing some working cycles while skipping (i.e. not firing) other working cycles. Thus, a particular cylinder may be fired, skipped and either fired or skipped over the course of three successive firing opportunities.

In contrast with a conventional variable displacement engine, the sequence of specific cylinders' firings will always be the same for multiple engine cycles, so long as the engine remains in the same displacement mode. With a conventional variable displacement eight-cylinder engine operating at half displacement for example, the same four cylinders are continually fired, while the remaining four cylinders are continually skipped over multiple engine cycles. With a skip fire controlled engine operating at a firing fraction of ⅓ for instance, every third firing opportunity is fired, while the intervening two firing opportunities are skipped. As a result over multiple engine cycles, at least one cylinder is fired in a first firing opportunity, skipped during the next firing opportunity, and either skipped or fired during the next firing opportunity.

In general, skip fire engine control facilitates finer control of the effective engine displacement than is possible with the conventional variable displacement approach. For example, firing every third cylinder in a 4-cylinder engine would provide an effective displacement of $⅓^{rd}$ of the full engine displacement, which is a fractional displacement that is not obtainable by simply deactivating a set of cylinders. Conceptually, virtually any effective displacement can be obtained using skip fire control, although in practice most implementations restrict operation to a set of available firing fractions, sequences or patterns.

The Applicant has filed a number of patents describing various approaches to skip fire control. By way of example, U.S. Pat. Nos. 7,849,835; 7,886,715; 7,954,474; 8,099,224; 8,131,445; 8,131,447; 8,464,690; 8,616,181; 8,651,091; 8,839,766; 8,869,773; 9,020,735: 9,086,020; 9,120,478; 9,175,613; 9,200,575; 9,200,587; 9,291,106; 9,399,964; 9,689,327; 9,512,794; and 10,247,072 each describe a variety of engine controllers that make it practical to operate a wide variety of internal combustion engines in a skip fire operational mode. Each of these patents is incorporated herein by reference.

Many of these patents relate to dynamic skip fire control in which firing decisions regarding whether to skip or fire a particular cylinder during a particular working cycle are made in essentially real time. That is, the fire/skip decision for a given cylinder is made just prior to the start of the next working cycle for that cylinder (i.e., on an individual cylinder firing opportunity-by-firing opportunity basis).

Pneumatic Springs

The Applicant has previously filed U.S. application Ser. No. 14/548,138 (TULA P030) on Aug. 8, 2017 (Now U.S. Pat. No. 9,726,094), which is directed to a system for managing catalytic converter temperatures, U.S. application Ser. No. 14/743,581 (TULA P38A) on Jul. 12, 2016 (Now U.S. Pat. No. 9,387,849), which is directed to implementing skip fire engine control upon engine start, and U.S. application Ser. No. 15/982,406 (TULA P064) filed Apr. 14, 2020 (now U.S. Pat. No. 10,619,584), which is directed to changing the timing of cylinder intake and exhaust events to form different types of pneumatic cylinder springs, such as Low Pressure Exhaust Springs (LPES), High Pressure Exhaust Springs (HPES) and/or Air Spring (AS), for skipped cylinders during skip fire engine operation. Each of the above-listed applications is incorporated by reference herein for all purposes.

The present invention is directed to use of different pneumatic cylinder spring types in a skip fire controlled engine to control engine and aftertreatment system temperatures. Particularly after a cold engine start, more rapid warm up of aftertreatment systems(s) and/or an engine block is realized by using one or more different types of pneumatic cylinder springs during skipped firing opportunities.

In another non-exclusive embodiment, the present invention is directed to a method of operating an internal combustion engine of a vehicle. The method involves ascertaining a cold start of the internal combustion engine, operating one or more cylinders of the internal combustion engine as a Low Pressure Exhaust Spring (LPES) until an aftertreatment system fluidly coupled to the internal combustion engine has reached a "light-off" temperature, operating the one or more cylinders of the internal combustion engine as a High Pressure Exhaust Spring (HPES) after the aftertreatment system has reached the "light-off" temperature and then operating the internal combustion engine in a skip fire manner after the temperature of the internal combustion engine has reached a predetermined threshold.

In yet another non-exclusive embodiment, the present invention is directed to a controller for controlling operation of an internal combustion engine. The controller is arranged to ascertain a cold start of an internal combustion engine, operate the internal combustion engine after the cold start such that some firing opportunities of the plurality of cylinders are fired while other firing opportunities of the plurality of cylinders are skipped. For the firing opportunities that are skipped, the controller initially operates one or more of the plurality of cylinders as a first pneumatic cylinder spring type until a catalytic converter fluidly coupled to receive exhaust gases from the internal combustion engine reaches a "light-off" temperature. After the catalytic converter has reached the light-off temperature, the controller operates one or more of the plurality of cylinders during skipped working cycles as a second pneumatic cylinder spring type until the internal combustion engine reaches a warm operating temperature. After the engine reaches its warm operating temperature, the controller operates the internal combustion engine in a skip fire manner. In variations of this embodiment, the first pneumatic cylinder spring type is an LPES and the second pneumatic cylinder spring type is a HPES.

In yet another non-exclusive embodiment, the present invention is directed to a method of operating a variable displacement internal combustion engine. The engine has a plurality of working chambers that operate with a working cycle. The method involves ascertaining a temperature of an aftertreatment system fluidly connected to the exhaust of the internal combustion engine. Some the engine's working cycles are skipped so that the engine is operating at less than its full displacement. A pneumatic cylinder spring type for skipped working cycles is determined based at least in part on a temperature of the aftertreatment system.

In yet another non-exclusive embodiment, the present invention is directed to a method of operating a variable displacement internal combustion engine. The engine has a plurality of working chambers that operate with a working cycle. The method involves ascertaining a temperature of the engine block of the internal combustion engine. Some the engine's working cycles are skipped so that the engine is operating at less than its full displacement. A pneumatic cylinder spring type for skipped working cycles is determined based at least in part on the temperature of the engine block.

Engine Controller

Figure 1A:
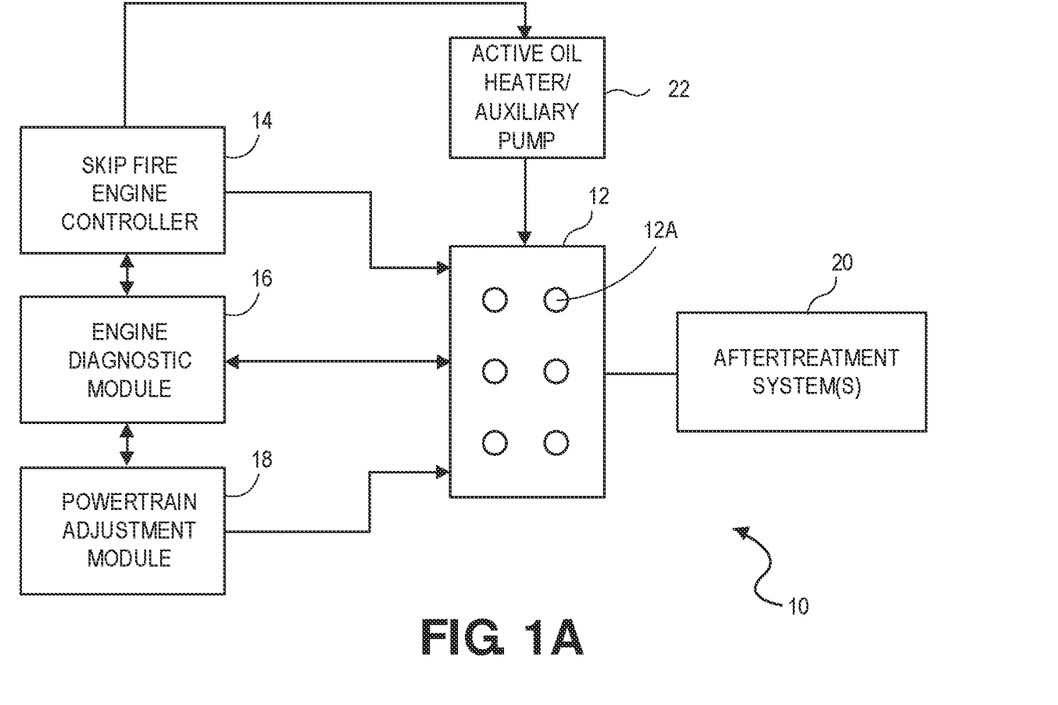
FIG. 1A is a logic diagram of a representative internal combustion engine, various control modules, and aftertreatment system(s) in accordance with a non-exclusive embodiment of the invention.

Referring to FIG. 1A, a schematic block diagram 10 is shown of a representative internal combustion engine 12. In addition, the block diagram 10 includes a skip fire engine controller 14, an engine diagnostic module 16, a powertrain adjustment module 18, and one or more aftertreatment system(s) 20, all of which work in cooperation with the engine 12. The aftertreatment systems(s) 20 are fluidly connected to the internal combustion engine exhaust.

The internal combustion engine 12 includes one or more cylinders 12A. In the particular embodiment illustrated, the engine 12 includes six cylinders 12A. It should be understood, however, that in alternative embodiments the number of cylinders 12A may widely vary. For instance, the engine 12 may include 2, 3, 4, 6, 8 10, 12 or 16 cylinders. It should be understood that the number of cylinders 12A listed herein are merely exemplary and the engine 12 may have any number of cylinders 12A, including more or less than explicitly listed herein.

In yet other embodiments, the internal combustion engine 12 may be able to combust any of a number of different types of fuels, such as gasoline, ethanol, Diesel, compressed natural gas, propane, methane, hydrogen, methanol, or any combination thereof.

In yet other embodiments, the internal combustion engine 12 may rely on spark-ignition or compression-ignition. As previously noted, in spark-ignition versions of the engine 12, a spark, typically from a spark plug, is generated to initiate combustion of the air-fuel charge in the cylinders 12A. In contrast, with compression ignition versions of the engine 12, ignition of the air-fuel charge is triggered by a combination of heat and pressure within the cylinders 12A. A compression ignition internal engine may have a glow plug installed in one or more of the engine's cylinders. In some embodiments, each cylinder in the engine may have a glow plug. The glow plug may be heated by running electrical current through a wire that heats the wire sufficiently that it emits visible light, hence the name glow plug. The glow plug may be used during a cold start to help initiate combustion in a compression ignition engine.

The internal combustion engine may also be a "boosted" engine. Although not illustrated, the internal combustion engine 12 may operate in cooperation with a turbocharger, supercharger, a combination of the two, i.e. a twincharger, and/or multiple turbochargers and/or superchargers. As is well known in the art, a turbocharger is powered by a turbine driven by exhaust gases from the engine 12, whereas a supercharger is usually mechanically driven by a belt connected to the crankshaft (not illustrated) of the engine 12. Regardless of which type of boosted system may be used, more air, and therefore proportionally more fuel, may be inducted into the individual cylinders 12A of the engine 12. As a result, a boosted version of the engine 12 is capable of generating more torque output compared to a naturally aspirated version of the engine 12.

The internal combusted engine 12 may also operate in cooperation with an Exhaust Gas Recirculation (EGR) system, also not illustrated. EGR, a known emissions reduction technique, operates by recirculating a portion of the exhaust gas back into the cylinders 12A of the engine 12. With the recirculated gas, the amount of oxygen inducted into the chambers 12A is reduced. The recirculated exhaust gas, which has less oxygen than fresh air, acts to absorb combustion heat and reduce peak temperatures within the cylinders 12A during combustion. As a result, less $NO_x$ is produced.

The skip fire engine controller 14 is arranged to determine a skip fire firing fraction for the internal combustion engine 12. The firing fraction is indicative of the percentage of firings that are required to deliver the torque output demanded of the engine 12 and also possibly the temperature of one or more aftertreatment system(s) 20. For example, following a cold start, the skip fire engine controller 14 may operate the engine 12 at a relatively low firing fraction so that (a) each fired cylinder 12A generates more torque compared to the engine 12 operating at a higher firing fraction and (b) using the higher exhaust temperatures of the cylinders 12A fired at the higher torque levels to rapidly heat up the aftertreatment system(s) 20. In another alternative embodiment, the skip fire engine controller 14 may be a Dynamic Skip Fire (DSF) engine controller. With DSF control, the decision to either fire or skip the cylinders 12A of the engine 12 is made on a firing opportunity-by-firing opportunity basis.

It should be appreciated that a firing fraction may be conveyed or represented in a wide variety of ways. For example, the firing fraction may take the form of a firing pattern, a firing density or any other firing sequence that involves or inherently conveys the aforementioned percentage of firings. For more details on how the skip fire engine controller 14 operates and selects a desired firing fraction, see the above listed commonly assigned U.S. patents and/or U.S. applications, again all of which are incorporated by reference.

The engine diagnostic module 16 is an onboard diagnostic tool that enables the monitoring and control of a wide variety of parameters associated with the internal combustion engine 12 and/or the aftertreatment systems 20. One such monitoring aspect performed by the engine diagnostic module 16 is the estimation of the temperature of certain types of aftertreatment system(s) 20, such as catalytic converters. As a general rule, most vehicles do not have temperature sensors located in the various aftertreatment systems 20 that may be used, such as a three-way catalytic converter, Diesel Oxidizing Catalyst (DOC), Selective Catalytic Reduction (SCR), etc. Accordingly, the engine diagnostic module 16 is tasked with estimating the operating temperature of such aftertreatment system(s) 20.

In a non-exclusive embodiment, the engine diagnostic module 16 is configured to estimate the temperature of various types of aftertreatment system(s) 20 from models derived from empirical data. For instance, a test vehicle, the same or similar to a vehicle using the engine 12, is placed on a dynamometer and multiple test runs are performed. With each test run, data is collected over time for (a) measured exhaust temperatures and (b) corresponding aftertreatment system temperatures. With this empirical data, a "temperature model" can be created that accurately predicts the temperature of the aftertreatment systems based on the amount of accumulated energy (e.g., volume of exhausted gas and its temperature) flowing through the aftertreatment system(s) over time. With any of the above-listed types of catalysts, for example, a catalytic temperature model can be created that accurately predicts the operational temperature of the catalyst, including approximately when "light-off" temperature is achieved based on such factors as the temperature of the exhaust gas provided to the catalyst, the accumulated volume of the exhaust gas over time, exothermic chemical reactions in the catalyst, and the starting temperature of the catalyst.

Another task performed by the engine diagnostic module 16 is ascertaining the temperature of the engine block and/or oil of the engine 12. This may be accomplished in a number of ways. For instance, the temperature of coolant used to cool the engine may be measured. Based on the measured coolant temperature, the temperature of the engine block and/or oil may be readily extrapolated. In other embodiments, the temperature of the engine block and/or oil can be directly measured by one or more sensors located in or near the engine block and/or oil pan.

The powertrain adjustment module 18, which operates in cooperation with the firing fraction controller 14, is provided to optimize certain powertrain parameters to ensure that the actual engine output equals the requested engine torque output at the commanded firing fraction. By way of example, the powertrain adjustment module 18 may be responsible for determining the desired spark timing for spark-ignition type engines. For compression ignition engines, the powertrain adjustment module may be responsible for determining a desired glow plug temperature. For both spark-ignition and compression-ignition engines other parameters that may be adjusted by the power adjustment module 18 include, but are not limited to, fuel injection timing, fuel injection pattern, injected fuel mass, cam phase, EGR fraction, throttle position, and intake manifold absolute pressure. Fuel injection pattern refers to the number of fuel injection pulses and the injected fuel mass associated with each pulse. For boosted engines, the boost level and compressor speed may also be controlled. By adjusting these engine parameters, the engine 12 may be optimized to operate as efficiently as possible to deliver an actual torque output that equals the demanded torque output.

Figure 1B:
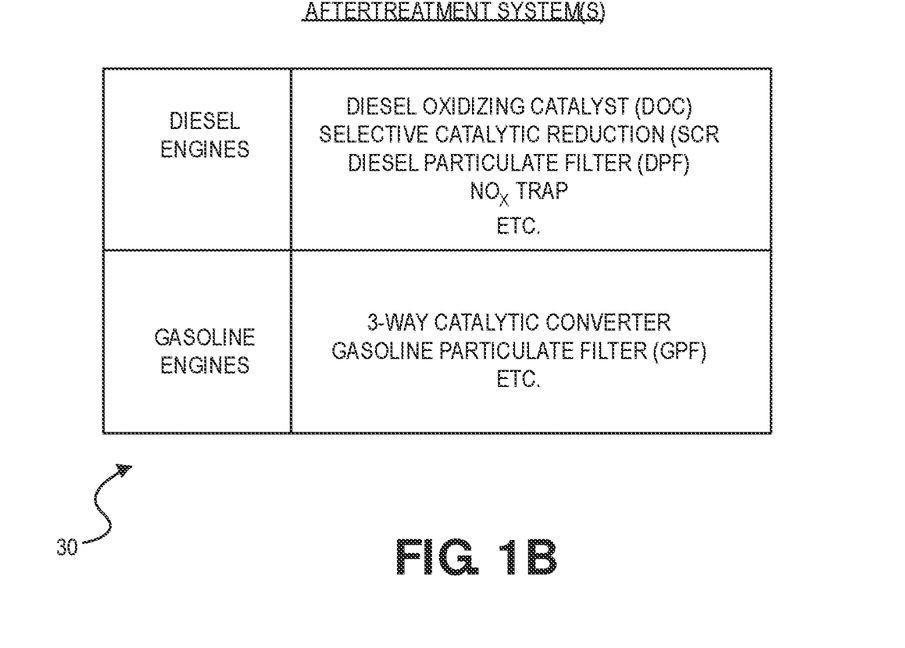
FIG. 1B is a table showing various types of aftertreatment system(s) that can be used with different types of engines.

FIG. 1B is a table 30 showing various types of aftertreatment system(s) that can be used with different versions of the engine 12. In particular, the table 30 shows that the various types of aftertreatment systems that may be used for a Diesel engine 12 may include a Diesel Oxidizing Catalyst (DOC), a Selective Catalytic Reduction (SCR) converter, a Diesel Particulate Filter (DPF), and a $NO_x$ trap. For gasoline versions of the engine 12, the various types of aftertreatment systems that may be used include three-way catalytic converters, Gasoline Particulate Filters (GPF), etc. It should be understood that the particular aftertreatment systems listed in the table 30 are merely exemplary and should not be construed as limiting in any regard. In real world embodiments, a given Diesel or gasoline engine 12 may have one or more of the listed aftertreatment system 20 as well as other aftertreatment systems not listed.

In some embodiments, a two-way catalyst that removes hydrocarbons and carbon monoxide from the exhaust stream, may be used in an aftertreatment system if no $NO_x$ removal is required. Such a catalyst is an oxidizing catalyst, since it is only configured to oxidize pollutants in the exhaust stream. Engines that run lean and use a form of low temperature combustion are an example of a type of internal combustion engine that may only require a two-way catalyst. A homogenous charge compression ignition (HCCI) engine is an example of an engine that utilizes low temperature combustion. Other aftertreatment systems may utilize some reducing element in addition to the two-way catalyst to reduce $NO_x$ emissions.

Oil Pumps and Heating Elements

In many skip fire controlled engines, a hydraulic system using engine oil is used to deactivate the intake and exhaust valves during skipped working cycles. Operation of the hydraulic deactivation system depends on there being sufficient oil pressure available to operate the deactivation mechanism. Also, the speed of deactivation mechanism is dependent on the oil viscosity, which in turn is dependent on oil temperature. During a cold start, the oil is generally cold and the initial oil pressure may be low. Therefore, the ability to deactivate cylinders on the initial working cycles of a cold start may be limited.

In an optional embodiment, an active oil heater and/or auxiliary oil pump 22 may be used in cooperation with the internal combustion engine 12. By actively heating the engine oil, the engine oil can be rapidly heated faster than just by naturally running the engine. By reducing the heating time following a cold start, the valve train will be ready to implement valve deactivation sooner, which means skip fire engine control can occur sooner and the strategies for heating the aftertreatment systems and the engine block as described below can all start earlier than otherwise possible without active steps to heat the engine oil.

An auxiliary, electrically driven, oil pump can be used either in conjunction with an active oil heater and may be used without an active oil heater. The auxiliary oil pump can raise oil pressure even before engine cranking begins during a cold start. As such, even the first working cycle of a cold starting engine may be deactivated. By using either or both the active oil heater and/or the auxiliary oil pump, pollutants such as hydrocarbons, carbon monoxide, $NO_x$ and/or particulates, emitted during cold starts can all be further reduced.

Operating Temperatures for Aftertreatment Systems

In order for the aftertreatment systems 20 in an exhaust system to function at peak efficiency, a certain elevated temperature range is required. For example, the catalysts in a three-way catalytic converter, Diesel Oxidation Catalysts (DOC) and/or Selective Catalytic Reduction (SCR) converters each have a relatively narrow operating temperature range. A representative operating range may be between 200° and 400° C., although other catalyst systems may have different ranges. The operating temperature range of aftertreatment elements for Diesel engines may be somewhat higher than that used for gasoline engines.

It is also common for vehicles to have more than one aftertreatment system 20. For example, besides a catalyst of some kind, vehicles may also include a particulate filter, a $NO_x$ trap, etc. Spark-ignition gasoline combustion engines generally have aftertreatment system(s) 20 that include both a three-way catalyst and possibly a Gasoline Particulate Filter (GPS), whereas Diesel compression-ignition engines may include one or more of a DOC, SCR, Diesel Particulate Filter (DPF), $NO_x$ trap, etc.

Generally, with vehicles having multiple aftertreatment systems 20, the system requiring higher operating temperature ranges are positioned closer to the engine 12 than the other system(s). Such an arrangement allows the first aftertreatment system 20, for example, a three-way catalytic converter, to experience the highest temperature exhaust stream from the engine 12. As the exhaust stream passes through subsequent systems in the exhaust path, it generally cools, unless significant energy is released in any of the downstream aftertreatment devices from exothermic chemical reactions (such as oxidization of uncombusted hydrocarbons), from an external heat source, or from some other heat source.

Cylinder Working Cycle

Figure 2A:
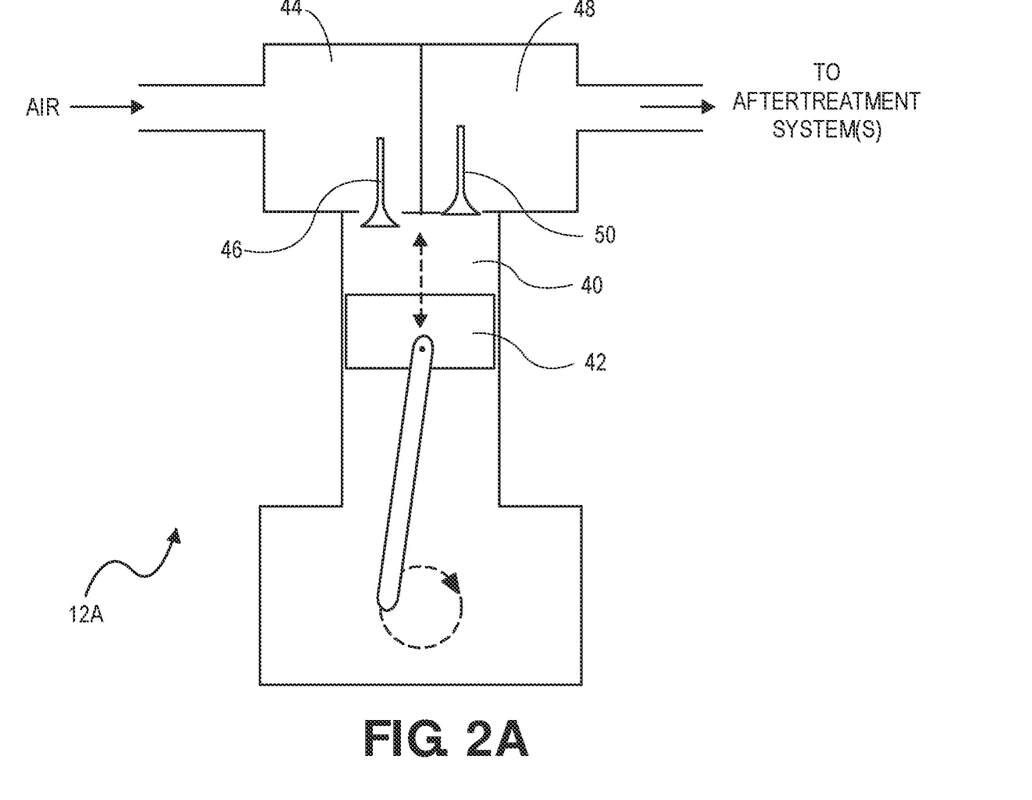
FIG. 2A and FIG. 2B illustrate a cylinder and operation of the cylinder during an exemplary working cycle of a four-stroke engine.
Figure 2B:
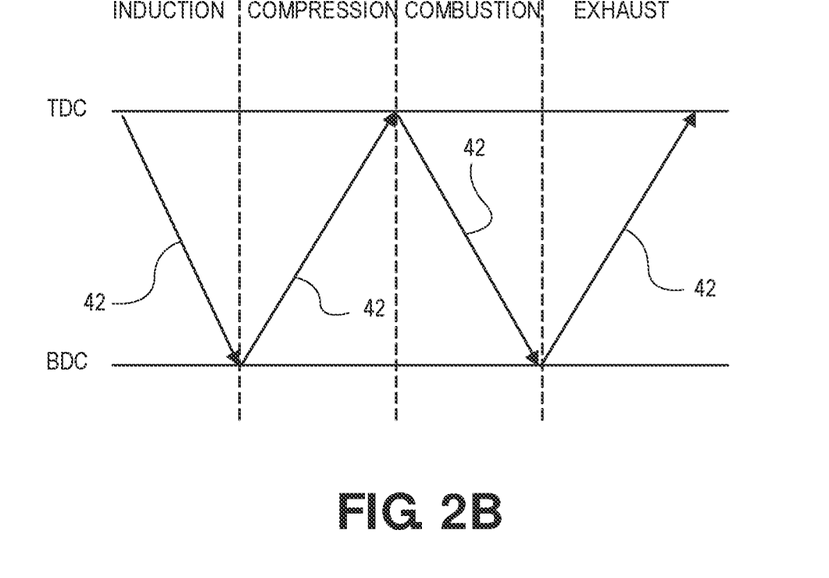

Referring to FIG. 2A and FIG. 2B, operation of a cylinder 12A of the engine 12 during a fired, four-stroke working cycle is illustrated.

As depicted in FIG. 2A, the cylinder 12A includes a working chamber 40, reciprocating piston 42, an intake air manifold 44 for receiving air, an intake valve 46, an exhaust manifold 48 and an exhaust valve 50.

As depicted in FIG. 2B, the four strokes performed by the cylinder 12A during a working cycle are illustrated. The four strokes include induction, compression, combustion (sometimes referred to as expansion) and exhaust.

In the induction stroke, the piston 42 moves from Top Dead Center (TDC) to Bottom Dead Center (BDC) as the intake valve 46 is moved to an open position. As a result, air is inducted into the working chamber 40 through the intake air manifold 44. A fuel injector (not shown) also may inject fuel into the chamber as well. Together, the air and fuel mixture create an air-fuel charge in the chamber 40.

In the compression stroke, the intake valve 46 is closed and the piston 42 moves from BDC to TDC, compressing the air-fuel charge within the chamber 40.

With spark-ignition engines, a spark is used to ignite the air-fuel charge. The timing of the spark is typically before the piston 42 reaches the TDC position as the compression stroke completes. With compression-ignition engines, there is no spark. Instead, a combination of high pressure and high temperature created within the chamber 40 as the piston moves toward and approaches TDC during the compression stroke initiates combustion. With either type of engine for fired working cycles, combustion is initiated before the piston 42 reaches the TDC position, completing the compression stroke.

In the combustion or more generally expansion stroke, combustion may be completed. The energy released causes the piston to move from TDC to BDC, resulting in the generation of useful work (i.e., a torque output) by the cylinder 12A.

Finally, in the exhaust stroke, the exhaust valve 50 is opened and the piston 42 moves from BDC to TDC, exhausting the combusted gases into the exhaust manifold 48, which is fluidly coupled to the aftertreatment system(s) 20.

The working cycle is complete when the exhaust valve 50 is closed and the piston 42 is positioned at the TDC. The above process is then repeated for the next working cycles of the cylinder 12A.

During a given engine cycle, the working cycles of the cylinders 12A are sequenced in order. The skip fire engine controller 14 determines which cylinders 12A are to be fired or skipped, based on the current firing fraction, each engine cycle. Thus, during each engine cycle, in their sequence order the individual cylinders 12A are either fired or skipped. As described below, the cylinders 12A of skipped working cycles may operate as one of several different types of pneumatic cylinder springs.

Valve Control for Pneumatic Cylinder Spring Type Implementation

With skip fire operation, the individual cylinders 12A may be selectively fired or skipped during any given working cycle. Typically, with skipped working cycles, the cylinder is deactivated, meaning no fuel is provided and the intake valve 46, the exhaust valve 50, or both, are deactivated to prevent air pumping. However, by manipulating the timing of the opening and/or closing of the intake and exhaust valves 46, 50, gases can be intentionally trapped within the working chamber 40, resulting in one of several different types of pneumatic cylinder springs.

A LPES is realized opening the exhaust valve 50 during the exhaust stroke in a prior fired working cycle and by deactivating the intake valve 46 during the induction stroke of a skipped working cycle that follows the fired working cycle. As a result, no air is inducted into the chamber 40 and low pressure exhaust gas is trapped in the chamber. During the subsequent compression stroke as the piston moves from BDC to TDC, the pressure inside the chamber 40 is relatively low because only residual combusted gas from the previous fired working cycle remains in the chamber 40. No fuel is injected into the chamber as well. As a result, there is no combustion during the combustion stroke, regardless if a spark occurs or not. Finally, in the exhaust stroke, the exhaust valve 50 is deactivated. As a result, the residual combusted gas remains within the chamber and is not exhausted. The above process may be repeated for as long as operating the cylinder 12A as a LPES is desired.

With an HPES spring, the induction, compression and expansion strokes occur as normal as described above with regard to FIGS. 2A and 2B during a fired working cycle. In the exhaust stroke of the fired working cycle, however, the exhaust valve 50 is not opened. As a result, high pressure combusted exhaust gas remains trapped within the chamber 40 and is not exhausted into the exhaust manifold 48. In the subsequent skipped working cycle, the intake valve 46 is deactivated so that no new air is inducted. Instead, the trapped exhaust gas is expanded in the intake stroke and then compressed in the compression stroke. Since there is no fresh air in the cylinder, and no fuel is typically injected, there is no combustion in the compression or expansion strokes. Instead, the trapped exhaust gas is again expanded in the expansion stroke and compressed in the exhaust stroke by maintaining the exhaust valve 50 closed. The cylinder 12A may operate as a HPES indefinitely; however, the in-cylinder pressure will slowly drop has the combusted gases cool and leak out of the chamber 40.

With Air Spring (AS) type pneumatic springs, the intake valve 46 opens during the induction stroke of a first AS skipped working cycle so air is inducted into the chamber 40. In the compression stroke, the inducted air is compressed, but no fuel is injected or present, so there is no combustion. The air is then expanded in the expansion stroke. In the exhaust stroke, the exhaust valve 50 is maintained closed so that the air is not exhausted. The intake valve 46 may remain closed during subsequent AS skipped working cycles, so that the compression and expansion of mostly air may continue indefinitely until a decision is made to terminate AS operation.

The three different types of pneumatic cylinder springs described above are all formed by leaving a valve closed on a stroke in which it would normally open during a fired working cycle. That is, the pneumatic cylinder spring type is realized by not opening at least one of an intake valve or exhaust valve during a skipped working cycle. In a HPES, the exhaust valve remains closed during the exhaust stroke in a fired working cycle prior to the skipped working cycle that has the HPES. The intake valve remains closed during the induction stroke of the skipped working cycle. In a LPES, the exhaust valve opens normally on a prior fired working cycle, but the intake valve remains closed during an induction stroke on a skipped working cycle that follows the fired working cycle or a prior LPES working cycle. The exhaust valve also generally remains closed during the exhaust stroke of skipped working cycles. In an AS, the intake valve opens during the induction stroke of a first skipped working cycle; however, the exhaust valve remains closed during the exhaust stroke. The intake valve may remain closed during any subsequent skipped working cycle in a series of skipped AS working cycles.

With the exception of a HPES, where the high pressure combusted gases remain trapped in the working chamber, both LPES and AS skipped working cycles may include opening the intake valve 46 during the induction stroke or the exhaust valve 50 on the exhaust stroke of one skipped working cycle during a series of skipped working cycles. Opening the intake valve 46 during the induction stroke in a series of AS working cycles may be known as re-intake or re-breathing. Opening the exhaust valve 50 during the exhaust stroke in a series of LPES working cycles may be known as re-exhaust.

The sequence of which valve remains closed during a stroke in which it would open on a normal fired working cycle determines the type of pneumatic cylinder spring. Since the valve closing sequence determines pneumatic cylinder spring type, not all combinations of pneumatic cylinder spring types are possible in a series of skipped working cycles. For example, a HPES spring working cycle cannot follow a LPES or AS working cycle without an intervening fired working cycle, since a HPES working cycle requires trapped high pressure exhaust gas that would not be present in a LPES or AS working cycle. AS and LPES working cycles may be intermixed and sequenced as desired.

Pneumatic Cylinder Spring Type Exhaust Temperatures

The Applicant has tested the exhaust gas and cylinder temperatures resulting from operating cylinders of an exemplary, 4-cylinder, gasoline engine as one of several different types of pneumatic cylinder springs. The operating conditions for the test involved an engine speed of 1300 RPMs (revolutions per minute), 1.5 bar of Brake Mean Effective Pressure (BMEP) and a firing fraction of $\frac{1}{3}^{rd}$. All three types of pneumatic cylinder springs were tested, including HPES, LPES and AS. As a base line, the cylinder temperature was measured with all four cylinders of the engine being fired (referred to herein as "I4"). In addition, the air to fuel ratio was kept at stoichiometric, so the fuel energy consumption rate for each test is also same.

Figure 3A:
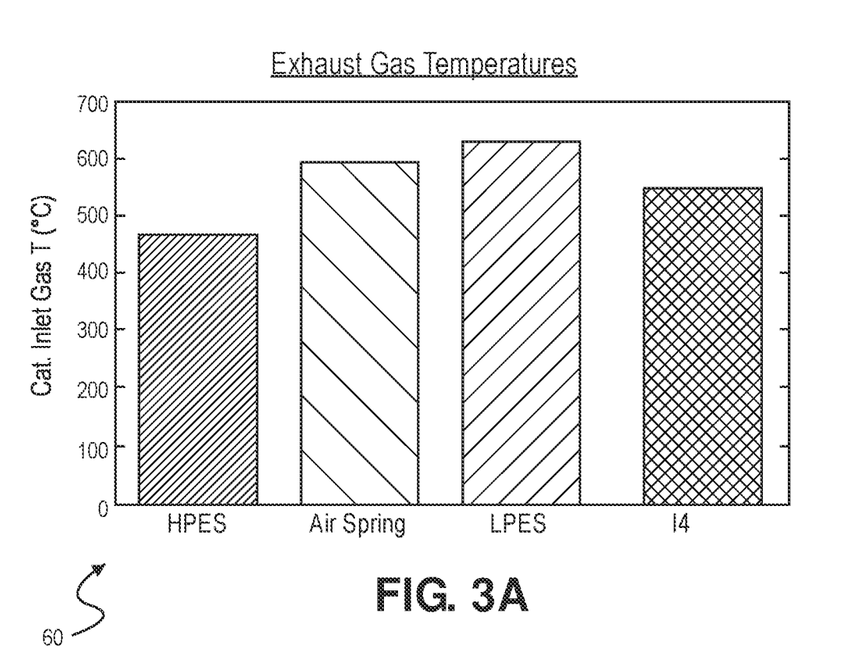
FIG. 3A is a bar graph illustrating various exhaust gas temperatures resulting from cylinders of an engine acting as one of several different types of pneumatic cylinder springs in accordance with a non-exclusive embodiment of the invention.

Referring FIG. 3A, a bar graph 60 illustrating various exhaust gas temperatures at the inlet of the three-way catalytic converter resulting from cylinder operation in HPES, AS, LPES and in the I4 mode are respectively shown. Based on graph 60, several conclusions can be drawn, including (a) LPES has the highest exhaust temperature (around 600° C.) and (b) HPES has the lowest exhaust temperature (around 475° C.). Since LPES generates a higher exhaust temperature than the other operating modes, operating skipped cylinders 12A of the engine 12 as an LPES can be beneficially used to warm up a three-way catalytic converter faster following a cold start. While an LPES allows the fastest warm up of the three-way catalyst, in some embodiments it may be advantageous to operate some skipped working cycles as an air spring to avoid prolong periods of sub-atmospheric pressures within a skipped cylinder. Also noteworthy is the observation that operating cylinders as HPES offer no advantage compare to the baseline of firing all four cylinders in mode I4 following a cold start.

Figure 3B:
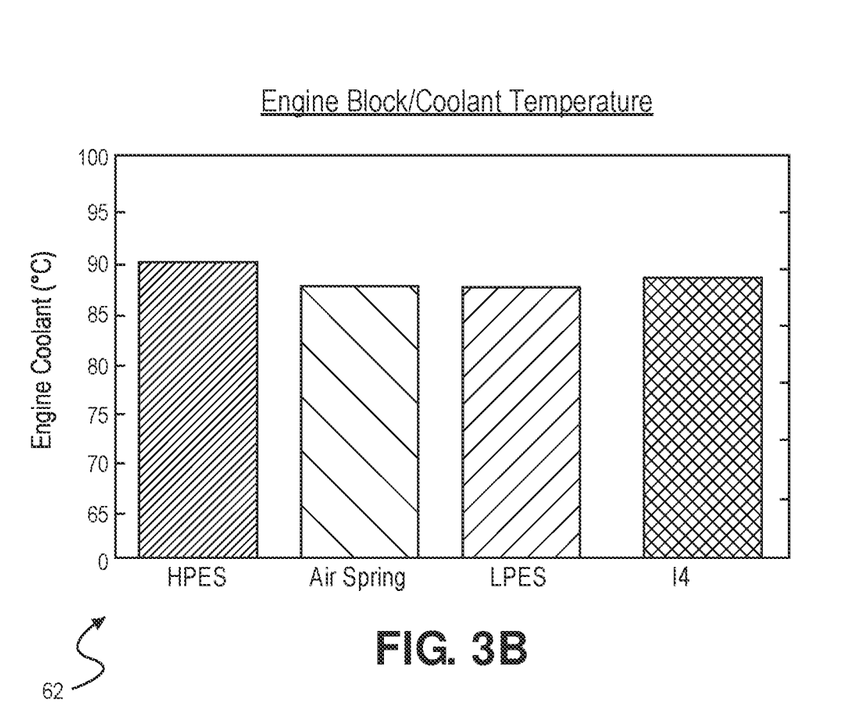
FIG. 3B is a bar graph illustrating various coolant temperatures resulting from cylinders of an engine acting as one of several different types of pneumatic cylinder springs in accordance with a non-exclusive embodiment of the invention.

Referring FIG. 3B, a bar graph 62 illustrating engine coolant temperatures resulting from operating cylinders as HPES, AS, LPES and in the I4 mode are respectively shown. Based on graph 62, the HPES operated engine has a higher engine coolant temperature (around 90° C.) compared to the other spring types and the all cylinder I4 mode. Therefore, HPES operation can best be used to rapidly heat the engine block.

The test results in the graphs 60, 62 therefore suggest a two-prong strategy for operating a skip fire controlled engine following a cold start. In the first prong, the one or more cylinders of skipped working cycles following a cold start can be operated as LPES type pneumatic cylinder spring. With the higher exhaust temperatures, aftertreatment system(s) 20, such as a catalytic converter, will reach their light off temperature(s) quicker. Once the light off temperature is achieved, then the second prong of the strategy involves operating one or more cylinders of skipped working cycles as HPES springs to more quickly heat up the engine block, oil and coolant of the engine. By implementing this two-prong approach, pollutants such as hydrocarbons, carbon monoxide, $NO_x$ and/or particulates, following cold starts can be significantly reduced. Engine efficiency may also be improved by heating the engine oil more quickly to reduce frictional losses.

It should be noted that the bar graphs of FIG. 3A and FIG. 3B are merely exemplary and are intended to show test results for a specific engine and vehicle. It should be understood that the results may vary for other types of engines and/or vehicles. As such, the results and conclusions drawn from either of FIG. 3A and FIG. 3B should not be construed as limiting.

More generally the pneumatic cylinder spring type may be chosen at least in part based on an ascertained temperature of the aftertreatment system or the engine block. Other variables, such as, but not limited to, in-cylinder pressure, fuel efficiency, engine speed, deactivation mechanism speed, cylinder load, and firing pattern may also be considered in the determination of the pneumatic cylinder spring type. The pneumatic cylinder spring type may be determined on a skipped working cycle by skipped working cycle basis, but this is not a requirement.

Other Engine and Aftertreatment System Heating Methods

Use of different pneumatic cylinder spring types to more quickly heat an engine or aftertreatment system may be combined with other heating methods. As noted above, an auxiliary oil heater may be used to more quickly heat engine oil during a cold start. Aside from enabling skip fire operation sooner, the auxiliary oil heater also heats the engine block, allowing it to more quickly reach operating temperatures. Glow plugs may be used to assist in heating a cylinder of a compression ignition engine. As previously described in U.S. Pat. No. 10,247,072, assigned to the Applicant, uncombusted fuel or hydrocarbons may be introduced into the aftertreatment system where they can exothermically react to heat the aftertreatment system. Hydrocarbons may be delivered to the aftertreatment system by opening the intake and exhaust valves of a cylinder during a skipped working cycle, while injecting fuel into the cylinder late in the power stroke. The result is uncombusted or only slightly combusted fuel in the exhaust stream delivered by the skipped cylinder. The uncombusted hydrocarbons can enter an oxidizing catalytic converter, which may be part of an aftertreatment system, and react exothermically with the air from the skipped working cycle. Other skipped working cycles may not deliver any uncombusted hydrocarbons to the aftertreatment system but may be used to pump air through the engine into the aftertreatment system increasing the amount of oxygen available to oxidize the uncombusted hydrocarbons in the aftertreatment system. The exothermic chemical reaction helps to heat the oxidizing catalytic converter. Such an approach can be particularly useful during an engine start-up period in which the oxidizing catalytic converter needs to be rapidly heated in order to minimize the emission of pollutants.

Has previously described in U.S. Pat. No. 9,726,094, assigned to the Applicant, faster warm up of an aftertreatment system may be achieved by selective firing of particular working chambers and not others. For example, during an engine startup period, the engine controller may fire only a particular subset of working chambers that are physically closer to the aftertreatment system. Since exhaust from these working chambers has a shorter path to travel, the exhaust loses less thermal energy and can help heat the aftertreatment system more quickly and efficiently. In some engines, to reduce cost, not all working chambers may be capable of deactivation. In such engines, working chambers capable of deactivation may be positioned more closely to the aftertreatment system than working chambers that do not have such capability. For example, the working chamber having the shortest exhaust flow path between the working chamber's exhaust valve and the aftertreatment system may be capable of deactivation.

Cold Starts

The term "cold start" as used herein is intended to be broadly construed. The term is often used to describe a situation where a vehicle is parked for an extended period of time and the engine cools to ambient temperature. When the engine is turned on, it is considered a "cold start" because the ambient temperature will almost always be less than the normal warm operating temperature of the engine. While such a situation is appropriately considered a "cold start", it is by no means the only situation that can be appropriately characterized as a cold start. On the contrary, any situation where a vehicle is started and either the engine and/or the aftertreatment system is/are below their normal warm operating temperature(s) is considered a cold start. For example, a driver may park, turn off their vehicle, and then restart the vehicle a few minutes later. During the interim, the temperature of the engine and/or the aftertreatment, systems may drop below their normal warm operating temperature, but still above ambient temperature. In such a scenario, restarting the engine is considered a "cold start". In another example, a vehicle may idle for an extended period of time with the engine running. Since little demand is being placed on the engine, the temperature of the engine and/or the aftertreatment system may drop below their normal warm operating temperatures. When the vehicle begins to move again, the situation is similar to a "cold start" because either or both the engine or aftertreatment system(s) are below their normal warm operating temperature. Thus, as used herein, the term "cold start" is intended to broadly be construed to cover any situation in which the engine and/or an aftertreatment system is operated below their normal warm operating temperature(s).

Flow Diagrams

Figure 4A:
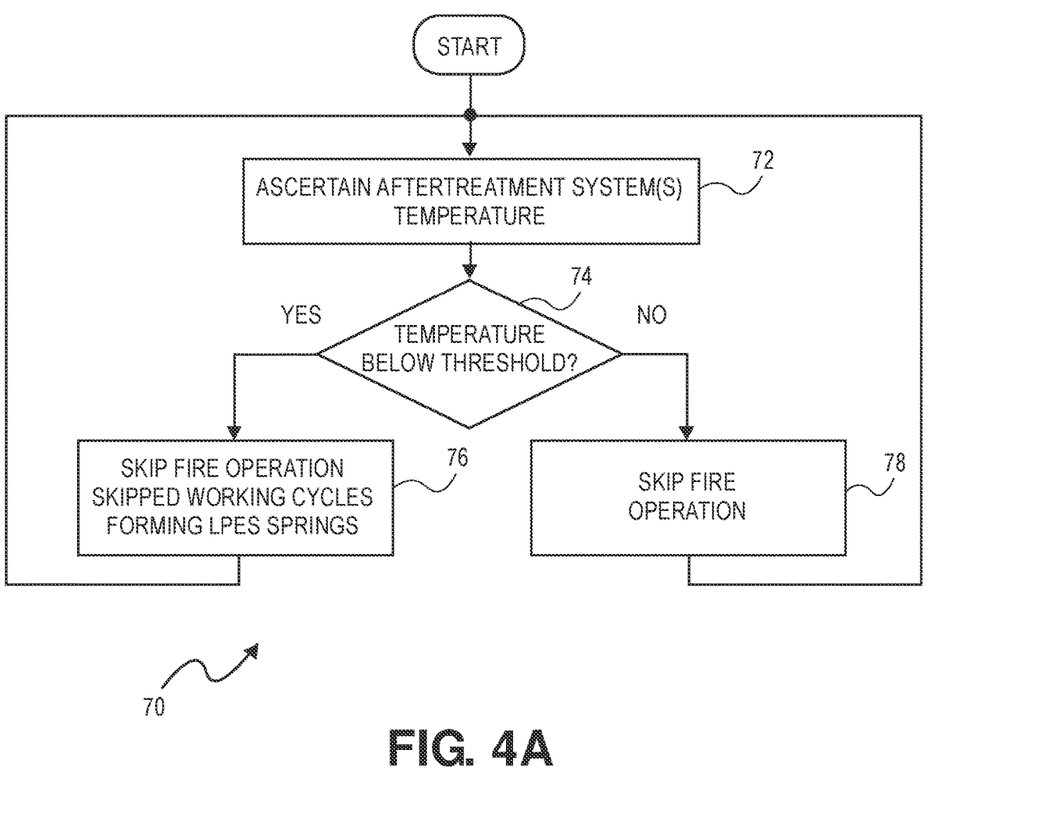
FIG. 4A is flow diagram illustrating steps for rapidly heating an aftertreatment system of a skip fire controlled engine in accordance with a non-exclusive embodiment of the invention.

Referring to FIG. 4A, a flow diagram 70 illustrating steps for rapidly heating one or more aftertreatment system(s) 20 is shown. The steps, as described below, are implemented by the skip fire engine controller 14 operating in cooperation with the engine diagnostic module 16 and the powertrain adjustment module 18 (see FIG. 1A). In particular, the skip fire engine controller 14 is responsible for selecting a firing fraction to meet the torque demands placed on the engine 12 as well as possibly controlling the temperature of the aftertreatment systems 20. The engine diagnostic module is responsible for ascertaining, among other tasks, the temperature of the engine 12, oil, coolant and/or the aftertreatment system(s) 20. The powertrain adjustment module 18 is responsible for making different powertrain adjustments as needed, such as when cylinders are fired, skipped or operated as one of the several pneumatic cylinder spring types as described herein.

In the initial step 72, the temperature of the aftertreatment system(s) is ascertained. In most situations, the temperature is estimated by using a temperature model created using empirical data collected from testing performed on the same or a similar engine and vehicle as described above. For instance, if the aftertreatment system 20 is a catalyst, then a temperature catalyst model can be constructed from the empirical test data. In other embodiments, the aftertreatment system(s) temperature can be ascertained by direct measurement by a temperature sensing device.

In decision step 74, the ascertained temperature is compared to a threshold temperature. In non-exclusive embodiments, the threshold temperature is the lowest temperature within the normal warm operating range of the aftertreatment system(s) in question. For instance, if the aftertreatment system is a catalytic converter having a normal warm operating range of around ~200° C. to ~600° C., then the threshold is set at or near 200° C. Thus, if the ascertained temperature is below the threshold, the operational situation of the vehicle is considered to be a "cold start" and steps are taken to rapidly heat the aftertreatment system.

In step 76, if the ascertained temperature is below the threshold, then the engine is operated in a skip fire manner with one or more working cycles of the skipped cylinders operated as an LPES spring. As a general rule, the more skipped working cycles operated as a LPES spring, the more heat energy is provided to the exhaust system, causing the downstream aftertreatment system(s) 20 to warm up faster.

The step 72, decision step 74 and the step 76 are repeated until the ascertained temperature exceeds the threshold temperature. In this way, the aftertreatment system(s) 20 is rapidly heated until the threshold temperature (i.e., the lower limit of the normal warm operating temperature) is reached.

In step 78, once the threshold temperature is reached, the engine is operated in a skip fire manner with firing opportunities either fired or skipped in accordance with the current firing fraction. In various embodiments, operating in the skip fire operation may mean skipped firing opportunities may involve operating skipped cylinders as LPES, AS, or HPES, or any combination thereof. For instance, with SI gasoline engines, it may be preferable to operate skipped cylinders as LPES type pneumatic springs, whereas it may be advantageous to operate skipped cylinders as AS or HPES type pneumatic springs with compression engines. It should be further noted that skip fire operation, any two or three types of pneumatic springs may alternatively and/or selectively be used. For example, the engine controller 14 may implement strategies to selectively use LPES, HPES and/or AS type springs to control the temperature of the aftertreatment system, reduce emissions and other pollutants, and/or improve fuel efficiency.

The above steps are continually repeated during operation of the vehicle. With this approach, the use of LPES springs helps warm up the aftertreatment system when the ascertained temperature falls below the threshold, such as following a cold start as the term is broadly construed herein.

Figure 4B:
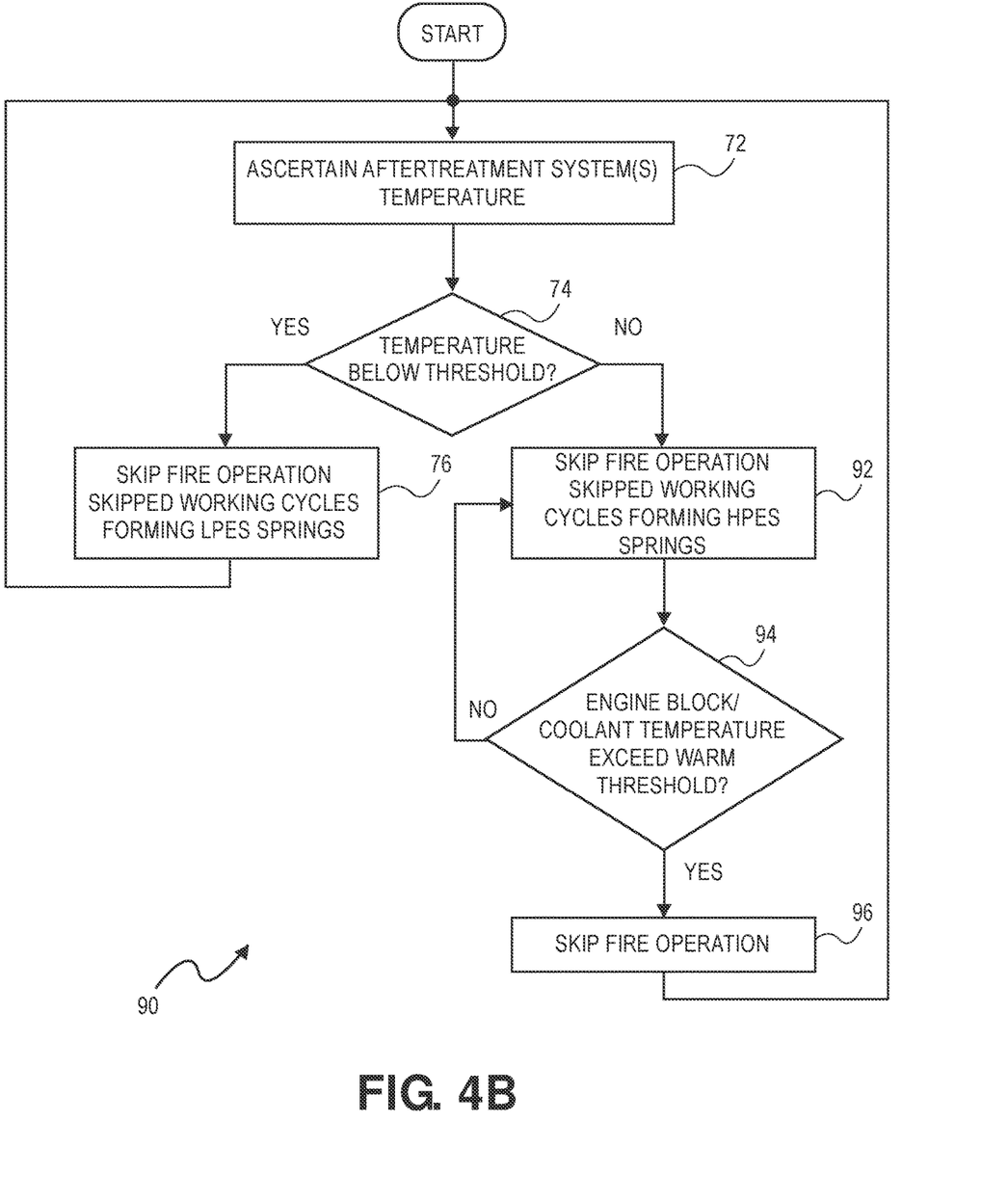
FIG. 4B is another flow diagram illustrating steps for rapidly heating both an aftertreatment system and an engine block of a skip fire controlled engine in accordance with another non-exclusive embodiment of the invention.

Referring to FIG. 4B, another flow diagram 90 illustrating steps for rapidly heating both an aftertreatment system and an engine block of a skip fire controlled engine is shown. With this embodiment, the two prong strategy mentioned above is implemented. That is, the aftertreatment system(s) 20 are first rapidly heated by operating skipped working cycles of cylinders as LPES springs. Once light off is achieved, then the second prong is implemented and skipped working cycles of cylinders are operated as HPES springs to rapidly heat the engine block. Again, these steps are largely implemented by the skip fire engine controller 14, the engine diagnostic module 16 and the powertrain adjustment module 18 as described above.

The steps 72, 74, and 76 are essentially the same as described above with regard to FIG. 4A and are therefore are not repeated herein for the sake of brevity. By implementing these steps, the aftertreatment system(s) 20 is/are rapidly heated following a cold start by operating skipped working cycles of cylinders as LPES springs. Once light off is achieved, then the second prong is implemented as described in the steps below.

In decision step 74, when the ascertained temperature exceeds the threshold, then in step 92 the engine is operated in a skip fire manner, with one or more working cycles of the skipped cylinders operated as a HPES spring. The more skipped working cycles operated as a HPES spring, the more heat energy is generated. As a result, the engine block, oil and coolant of the engine 12 heats up faster.

In decision step 94, the temperature of the engine block and/or coolant is ascertained and compared to a threshold temperature indicative of the normal warm operating temperature of the engine. So long as the ascertained temperature is less than the threshold, then step 92 is performed.

In step 96, normal skip fire operation begins when the ascertained engine block/coolant temperature exceeds the threshold. During normal skip fire operation, cylinders are fired or skipped per the currently defined firing fraction. As previously discussed with regard to step 78, the engine controller may operate the skipped cylinders as LPES, AS or HPES type pneumatic springs, or any combination thereof.

The above steps are continually repeated. In this way, the cylinders of skipped working cycles can be used as LPES springs to rapidly heat various aftertreatment systems 20, and once light off is achieved, then as HPES springs to rapidly heat the engine block of the engine 12 whenever appropriate, such as following any cold start as the term is broadly construed herein.

Although only a few embodiments have been described in detail, it should be appreciated that the present application may be implemented in many other forms without departing from the spirit or scope of the disclosure provided herein. For example, while the invention has generally been described as applicable to a skip fire controlled engine, the invention is not so limited. The invention may be applied to a variable displacement engine that can only deactivate a group of one or more cylinders so long as the deactivation control mechanism is configured to allow control of the pneumatic cylinder spring type on skipped working cycles. Not all of the cylinders in the variable displacement engine need to be capable of cylinder deactivation. Thus, not all of the intake valves and exhaust valves need to have a deactivation mechanism, In some embodiments, only the cylinder having the shortest exhaust flow path to the aftertreatment system may be capable of cylinder deactivation. Therefore, the present embodiments should be considered illustrative and not restrictive and is not to be limited to the details given herein, but may be modified within the scope and equivalents of the appended claims.

What is claimed is:

1. A controller configured to operate an internal combustion engine during a cold start such that (a) some skipped cylinder firing opportunities are operated as a first pneumatic cylinder spring until an aftertreatment system fluidly coupled to the internal combustion engine has reached a first threshold temperature, and (b) other skipped firing opportunities are operated as a second pneumatic cylinder spring until the internal combustion engine has reached a second threshold temperature.

2. The controller of claim 1, wherein the first pneumatic cylinder spring is a Low Pressure Exhaust Spring (LPES) and the first threshold temperature is a light-off temperature for the aftertreatment system.

3. The controller of claim 1, wherein the second pneumatic cylinder spring is a High Pressure Exhaust Spring (HPES) and the second threshold is a warm operating temperature of the internal combustion engine.

4. The controller of claim 1, further configured to control adjusting one or more of the following when transitioning operation from the first pneumatic cylinder spring to the second pneumatic cylinder spring:
   (a) spark timing;
   (b) fuel injection timing;
   (c) fuel injection pattern;
   (d) fuel injected amount;
   (e) cam phase;
   (f) Exhaust Gas Recirculation (EGR) fraction;
   (g) throttle position;
   (h) boost level;
   (i) intake manifold absolute pressure;
   (j) compressor speed;
   (k) glow plug temperature;
   (l) any combination of (a) through (k).

5. The controller of claim 1, wherein the internal combustion engine is a spark-ignition gasoline engine and the aftertreatment system is a three-way catalytic converter.

6. The controller of claim 1, wherein the internal combustion engine is a Diesel compression-ignition engine and the aftertreatment system is a Diesel Oxidizing Catalyst (DOC) or a Selective Catalytic Reduction (SCR) catalytic converter.

7. The controller of claim 1 wherein the internal combustion engine runs with a lean stoichiometric air/fuel ratio and the aftertreatment system includes a two-way catalyst.

8. A vehicle, comprising:
   an internal combustion engine (ICE);
   an aftertreatment system fluidly coupled to the ICE;
   a controller configured to control operation of the ICE, the controller configured to:
      detect a cold start of the ICE;
      operate some skipped cylinder firing opportunities of the ICE as a first pneumatic cylinder spring until the aftertreatment system has reached a first threshold temperature; and
      operate other skipped cylinder firing opportunities as a second pneumatic cylinder spring until the ICE has reached a second threshold temperature.

9. The vehicle of claim 8, wherein the first pneumatic cylinder spring is a Low-Pressure Exhaust Spring (LPES) and the first threshold temperature is a light-off temperature for the aftertreatment system.

10. The vehicle of claim 8, wherein the second pneumatic cylinder spring is a High-Pressure Exhaust Spring (HPES) and the second threshold is a warm operating temperature of the ICE.

11. The vehicle of claim 8, wherein the controller is further configured to control adjusting one or more of the following parameters of the vehicle when transitioning operation from the first pneumatic cylinder spring to the second pneumatic cylinder spring:
   (a) spark timing;
   (b) fuel injection timing;
   (c) fuel injection pattern;
   (d) fuel injected amount;
   (e) cam phase;
   (f) Exhaust Gas Recirculation (EGR) fraction;
   (g) throttle position;
   (h) boost level;
   (i) intake manifold absolute pressure;
   (j) compressor speed;
   (k) glow plug temperature;
   (l) any combination of (a) through (k).

12. The vehicle of claim 8, wherein the ICE is a spark-ignition gasoline engine and the aftertreatment system is a three-way catalytic converter.

13. The vehicle of claim 8, wherein the ICE is a Diesel compression-ignition engine and the aftertreatment system is a Diesel Oxidizing Catalyst (DOC) or a Selective Catalytic Reduction (SCR) catalytic converter.

14. The vehicle of claim 8, wherein the ICE runs with a lean stoichiometric air/fuel ratio and the aftertreatment system includes a two-way catalyst.

15. The vehicle of claim 8, wherein the controller is a skip fire controller configured to selectively operate the ICE in an effective reduced displacement mode, that is less than full displacement of the ICE, such that at least one cylinder is fired, skipped and then either fired or skipped over successive working cycles of the least one cylinder respectively.

16. A vehicle, comprising:
   a variable displacement internal combustion engine having a plurality of working chambers that operate on a working cycle basis, each working chamber having an intake valve and an exhaust valve;

a controller configured to control operation of the variable displacement internal combustion engine, the controller configured to:

operate the internal combustion engine at less than full displacement following a cold start of the variable displacement internal combustion engine;

ascertain a temperature of an aftertreatment system fluidly coupled to the exhaust valves of the plurality of working chambers;

while the variable displacement internal combustion engine is operating at less than the full displacement, operate some working cycles that are skipped as a first pneumatic cylinder spring based at least in part on the ascertained temperature of the aftertreatment system; and while the variable displacement internal combustion engine is operating at less than the full displacement, operate other working cycles that are skipped as a second pneumatic cylinder spring based at least in part on an ascertained temperature of the variable displacement internal combustion engine.

17. The vehicle of claim 16, wherein the first pneumatic cylinder spring is a low-pressure exhaust spring, and the second pneumatic cylinder spring is a high-pressure exhaust spring, and the controller is configured to transition from the first pneumatic cylinder spring to the second pneumatic cylinder spring when the ascertained temperature of the aftertreatment system reaches a light-off temperature.

18. The vehicle of claim 16, further configured to oxidize uncombusted hydrocarbons in an exothermic chemical reaction in the aftertreatment system following the cold start of the internal combustion engine.

19. The vehicle of claim 16, wherein at least some of the skipped working cycles are pumping working cycles that pump air into the aftertreatment system to increase an amount of oxygen available to oxidize uncombusted hydrocarbons in the aftertreatment system following the cold start of the internal combustion engine.

20. The vehicle of claim 16, wherein uncombusted hydrocarbons and air are delivered to the aftertreatment system, following the cold start, by opening the intake and the exhaust valves of at least one working chamber during at least one of the skipped working cycles, while injecting fuel into the at least one working chamber late in a power stroke of the at least one skipped working cycle.

* * * * *